UNITED STATES PATENT OFFICE.

EMIL FRANKE, OF GRÜNAU, NEAR BERLIN, GERMANY, ASSIGNOR TO CHEMISCHE FABRIK GRÜNAU LANDSHOFF & MEYER AKTIENGESELLSCHAFT MANUFACTURING CHEMISTS, OF GRÜNAU, NEAR BERLIN, GERMANY.

PROCESS OF PRODUCING CONCENTRATED FORMIC ACID FROM FORMATES.

No. 857,046.     Specification of Letters Patent.     Patented June 18, 1907.

Application filed June 27, 1906. Serial No. 323,687.

*To all whom it may concern:*

Be it known that I, Dr. EMIL FRANKE, a subject of the King of Prussia, and a resident at Grünau, near Berlin, Germany, have invented an Improved Process for Producing Concentrated Formic Acid from Formates, of which the following is a specification.

The present invention relates to and has for its object an improved process for producing concentrated formic acid from formates.

In decomposing a formate by means of a rather powerful acid, decomposition of the formic acid takes place to a certain extent. For example, in heating formate of soda with concentrated sulfuric acid up to 45 per cent. of the formic acid is lost, and with 90 per cent. phosphoric acid up to 35 per cent. is lost. For this reason it has hitherto been possible to only make somewhat weak formic acid of about 60 to 65 per cent. proportion of acid, rather weak sulfuric acid and damp formate having been used. The French patent specification 341,764 made known a method by which it was also possible to employ highly concentrated sulfuric acid for decomposing formates and thus to make highly concentrated formic acid. The characteristic feature of that method consists in dissolving or intimately mixing the formates in concentrated formic acid and then adding sulfuric acid to this mixture. Instead of sulfuric acid, bi-sulfate of soda can be used in precisely the same manner, i. e. after mixing the formate with concentrated formic acid, the sulfuric acid in this sulfate acting analogously to the sulfuric acid.

Now the observation has been made that acid salts, for example, sodium bi-sulfate, may be allowed to act directly on formate of soda without previous mixture of the same with formic acid, without fearing decomposition of the formic acid. Comparative experiments as to the decomposition of dry formate of soda with concentrated sulfuric acid, of a mixture of formic acid and formate of soda with concentrated sulfuric acid, and of dry formate of soda with bisulfate of soda gave the following results in the same order, i. e.: 60.9, 128.5 and 132.6 grams of formic acid (100 per cent.) were obtained from 200 grams of formate (100 per cent.), i. e. 45 per cent., 95 per cent., and 98 per cent. yield were obtained. From this it is clearly seen that by using sodium bisulfate a previous mixing of the formate with formic acid may be omitted, without fearing a diminished yield.

The following is a suitable method of carrying out the decomposition:—100 parts of commercial formate of soda are intimately mixed with 200 parts of finely powdered sodium bisulfate (90 per cent.) and the mixture is heated in a retort, said retort being preferably provided with a stirrer. Formic acid of 97–98 per cent. concentration distils over. A quite loose powder of anhydrous sodium sulfate remains behind in the retort, on account of which a stirrer may be dispensed with. This advantageous issue of the reaction was not to be seen forthwith, as the contaminations accompanying commercial bisulfate could easily have an inconvenient or troublesome effect, especially without previous mixing with formic acid.

I claim:

1. A process for producing concentrated formic acid from formate, consisting in intimately mixing a solid formate with the solid acid salt of a polybasic acid which is stronger than formic acid, and in submitting the mixture thus formed to distillation.

2. A process for producing concentrated formic acid from formates, consisting in intimately mixing a solid formate with the solid acid salt of a polybasic acid which is stronger than formic acid, and in submitting the mixture thus formed to distillation in a retort, whereby said formic acid is distilled off.

3. A process for producing concentrated formic acid from formates, consisting in intimately mixing a solid formate with sodium bisulfate, and in submitting the mixture thus formed to distillation.

4. A process for producing concentrated formic acid from formates, consisting in intimately mixing a solid formate with the acid salt of a polybasic acid which is stronger than formic acid, and in submitting the mixture thus formed to distillation in a retort and in stirring the same during distillation, whereby said formic acid is distilled off, substantially as described.

In witness whereof I have hereunto signed my name this 15th day of June, 1906, in the presence of two subscribing witnesses.

EMIL FRANKE.

Witnesses:
PAUL F. MEYER,
WALTER SAECHTLING.